United States Patent Office 3,020,461
Patented Feb. 6, 1962

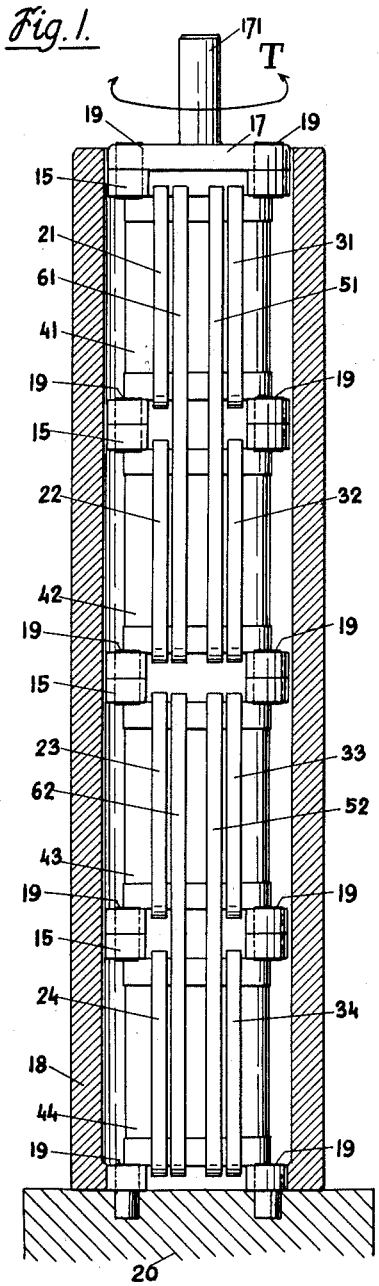
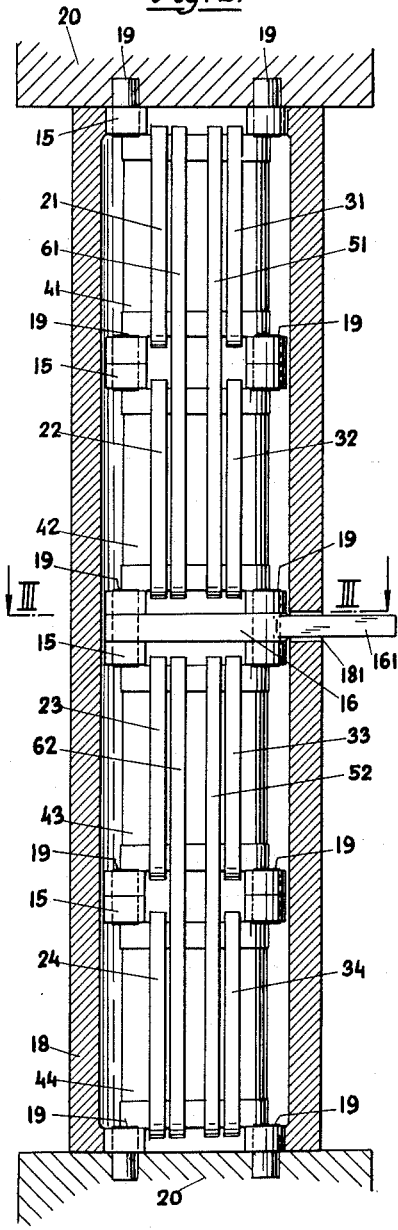

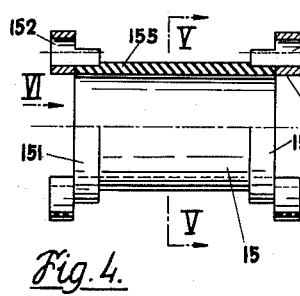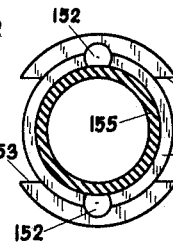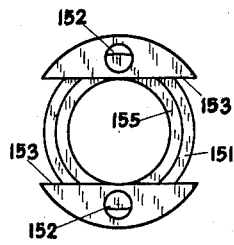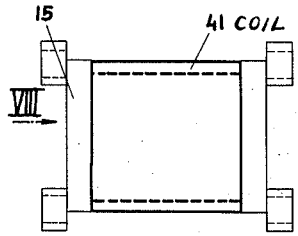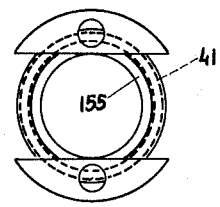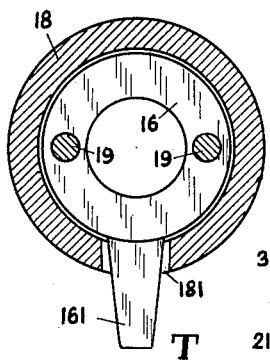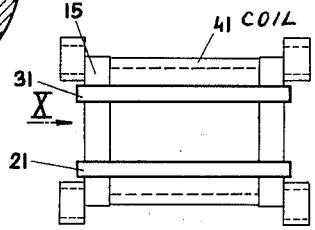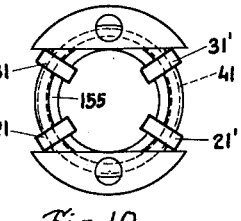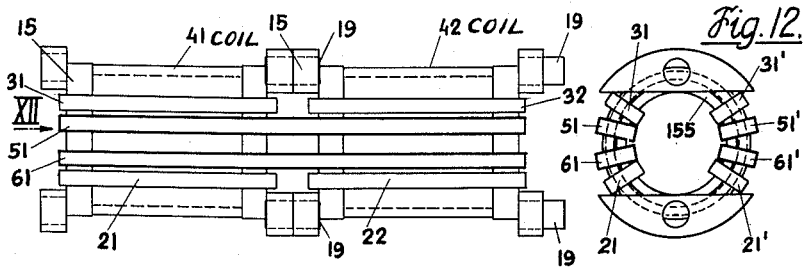

3,020,461
TORSIONAL MAGNETOSTRICTION FEELER APPARATUS EMPLOYING FEEDBACK
Bořivoj Dubský, Oldřich Straka, and Blahoslav Trefil, Prague, Czechoslovakia, assignors to Vyzkumný a zkusebni letecky ustav, Letnany, near Prague, Czechoslovakia
Filed Mar. 4, 1959, Ser. No. 797,242
Claims priority, application Czechoslovakia Mar. 7, 1958
4 Claims. (Cl. 318—28)

The present invention relates to a torsional magnetostriction feeler comprising an even number of rigidly interconnected torsional bodies which are each provided with exciting, polarization and pick-up windings. The previously known feelers of this type, based on the principle of torsional magnetostriction, the so-called Wiedemann effect, comprise a torsional tube provided with an exciting and a pick-up winding only, and, if required, with a polarizing winding. Although, in comparison with feelers based on capacitance, inductance or resistance principles, such feelers have a considerable output voltage, which is proportional to the torsional moment, this output voltage is not sufficient to directly control servomotors, even those of a relatively small size. The use of amplifiers, indispensable in most cases, is however, the cause of considerable difficulties.

The main object of the present invention is to provide a torsional magnetostriction feeler which to a substantial extent removes the aforesaid drawbacks. The main feature of the invention resides in that in addition to the above quoted features all torsional bodies are provided with torroidal feedback windings which are connected in the diagonal leg of a bridge circuit, in the branches of which bridge circuit the pick-up and polarization windings are connected. The circuit of the exciting windings is arranged symmetrically in a bridge configuration, the load being connected in the diagonal leg of the bridge configuration. By this arrangement the output voltage of the feeler, which appears at the terminals of the pick-up coils, is supplied to the feedback winding, which in the form of a torroid surrounds a part of the torsional body. Due to the passage of current through the feedback winding the inductive reactances of the two independent branches of the torroidal exciting windings are changed, which leads to a disturbance of the equilibrum in the exciting windings. By this change in equilibrium a current is produced in the central or load part of the exciting circuit, the current being proportional to the current in the feedback or control winding as well as to the voltage at the terminals of the pick-up coils. The magnitude of this current is considerable, so that in some cases a sufficient output voltage for driving small servomotors and similar devices is produced.

The accompanying drawings illustrate an exemplary embodiment of the invention, including a modification thereof, and, further, depict all its main parts, the method of winding the coils on the torsional bodies and, finally, the wiring diagram therefor. In the drawings:

FIG. 1 denotes an overall longitudinal section through the feeler, in an arrangement wherein the torsional force T is supplied to one end of the feeler.

FIG. 2 represents likewise a longitudinal section through the feeler, but in an arrangement where the torsional force T is fed to the centre of the feeler, both ends of which are rigidly fastened.

FIG. 3 is a cross-sectional view along the line III—III of FIG. 2, showing the arm for supplying the torsional force T.

FIG. 4 shows the individual torsional body—the upper half in longitudinal section, the lower half in plan view.

FIG. 5 is a cross-section along the line V—V of FIG. 4.

FIG. 6 is a side view in the direction VI indicated in FIG. 4. Further represented are the individual phases of the winding operation—first of the individual torsional body, then the winding on two connected bodies.

FIG. 7 shows the winding of the pick-up coil, which is wound on each body.

FIG. 8 is a side view in the direction VIII indicated in FIG. 7.

FIG. 9 shows the winding of two separate polarizing and exciting torroidal windings, each consisting—as shown in FIG. 10 (in a side view in the direction X indicated in FIG. 9)—of two windings.

FIG. 11 illustrates the manner in which the fronts of two torsional bodies that have been wound are connected and then surrounded with two further torroidal windings—a magnetising and a feedback winding. Each of them comprises according to FIG. 12 (in a side view in the direction XII indicated in FIG. 11)—two windings.

Figure 13:
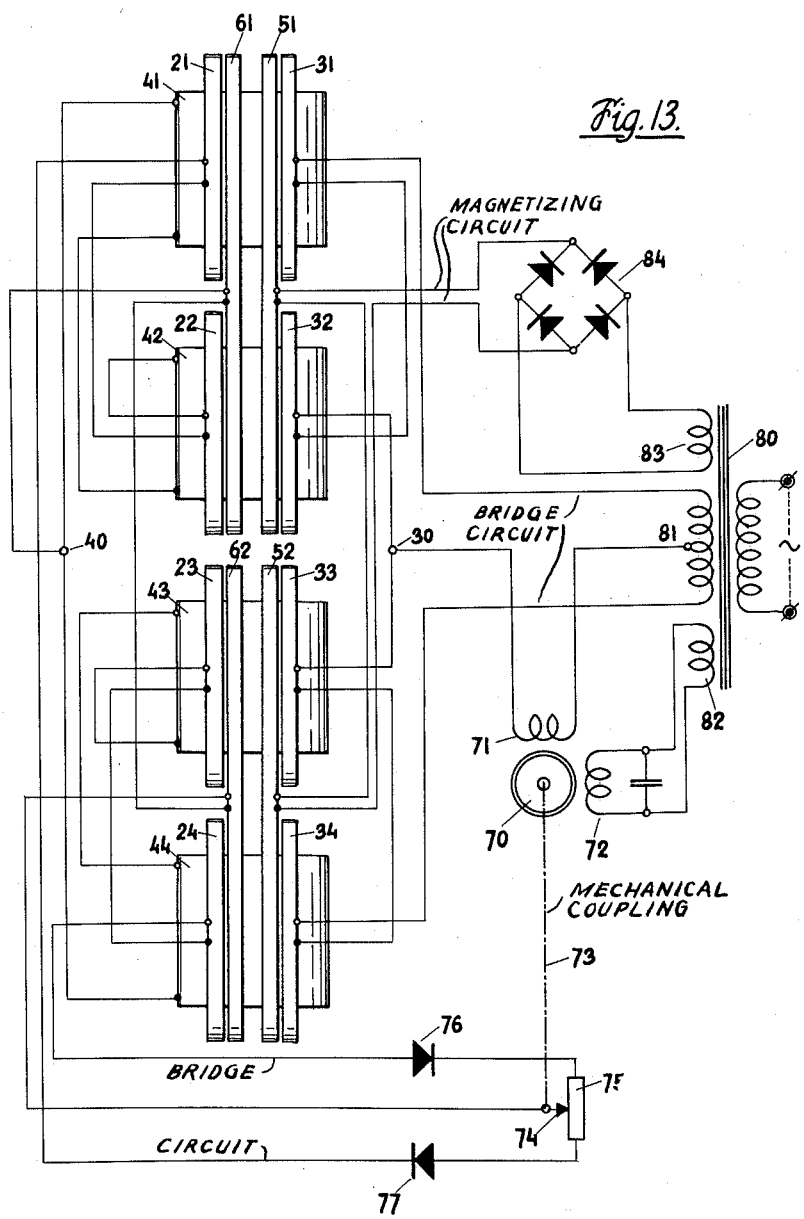
FIG. 13 is the overall wiring diagram showing a servo-motor for adusting the central contact of the potentiometer. In this diagram of the windings of the feeler the beginnings of the windings are marked with empty rings, the ends of the windings with black rings.

The basic element of the feeler is a torsional body 15 (see FIGS. 4, 5 and 6), its main component part being a tube 155 of magnetic material. Rigidly secured at both its ends are flanges 151 of non-magnetic material, the front faces of which are provided with recesses 153 and wtih apertures 152 for connecting pins 19 (see also FIGS. 1 and 11).

On the tube 155 of each torsional body 15 a pick-up coil is first wound. FIGS. 7 and 8 show a pick-up coil 41 on the torsional body; and on the other torsional bodies similar coils 42, 43 and 44 are wound. Then torroidal windings are wound over both flanges 151, the pick-up winding 41 and through the interior of the tube 155. These windings are the polarization winding 21 with its other coil 21' and the exciting winding 31 with its second coil 31', as shown in FIGS. 9 and 10.

A pair of wound torsional bodies 15 is then by means of pins 19 combined into one coaxial unit—shown in FIG. 11—whereupon this unit is surrounded with two pairs of torroidal windings: the magnetising winding 51 with the other coil 51 and the feedback winding 61 also with the other coil 61. From two units arranged in this way, each of which consists of a pair of torsional bodies 15, the torsional feeler itself is built up.

FIG. 1 shows an example of a feeler in which the torsional bodies 15 or the column comprising such bodies are rigidly anchored in a base-plate 20 to which a co-axial casing 18 is also secured. Fastened to the upper torsional body 15 is a flange 17 with a stud 171, to which the torque T which has to be measured is transmitted.

In the modified embodiment according to FIGS. 2 and 3 the column comprising four torsional bodies 15 is secured to an arm 161 (see FIG. 3).

The wiring diagram of the apparatus is shown in FIG. 13, wherein for the sake of simplicity the aforesaid second coils 21', 22', 23', 24', 61', 62', 31', 32', 33', 34', 51' and 52' are not represented, because as far as the wiring is concerned, such coils always form one unit with the original coils 21, 22 etc. The windings shown in the drawing are connected in the following way:

End of polarization winding 21 to end of polarization winding 22, beginning of polarization winding 22 to beginning of pick-up winding 42, end of pick-up winding 42 to end of pick-up winding 41, beginning of pick-up winding 41 to end of pick-up winding 44, beginning of pick-up winding 44 to beginning of pick-up winding 43, end of pick-up winding 43 to beginning of polarization winding 23, end of polarization winding 23 to end of polarization winding 24.

One circuit is thus formed in such a manner that the beginnings of both polarization windings 21 or 24 are connected over rectifiers 77 or 76 respectively to both ends of a potentiometer 75, the runner 74 of which is connected to the beginning of the feedback winding 62. The end of this winding 62 is connected to the end of the other feedback winding 61. The beginning of the feedback winding 61 is attached at a point 40 to the connection between the beginning of the pick-up winding 41 and the end of the pick-up winding 44. Thus the whole pick-up circuit is formed.

The exciting circuit comprises exciting windings 31, 32, 33 and 34 which are connected as follows:

End of winding 31 to end of winding 32, beginning of winding 33 to end of winding 34.

The beginnings of both windings 31 and 34 are connected to both ends of one secondary winding of a transformer 80. The point 30 of the connection between the beginnings of the exciting windings 32 and 33 is connected over a control winding 71 of a two-phase motor 72 to the centre 81 of the secondary winding. The other control winding 72 of the motor 70 is connected to the other secondary winding 82 of the transformer 80. The motor 70 serves for displacing the runner 74 of the potentiometer 75 by means of a suitable mechanical transmission which is diagrammatically marked with reference numeral 73.

The magnetising circuit comprises two magnetising coils 51 and 52 connected in series. The beginning of coil 51 and the end of coil 52 are attached to a full-wave rectifier 84, which is supplied from the third secondary winding 83 of the transformer 80. The torsional magnetostriction feeler according to the invention operates as follows:

Under the influence of alternating current supplied by the transformer 80 into all exciting windings 31 to 34 a so-called cylindrical magnetic field is generated in all four tubes 155 of all four torsional bodies 15. When the torsional bodies are mechanically stressed by a torque T, a voltage is induced in the pick-up windings 41 to 44, the size of which is proportional to the size of the torque T. The pairs of exciting windings 31 and 32 or 33 and 34 are connected in an opposite sense with respect to each other, in order to prevent a voltage from being induced by these exciting windings into the feedback windings 61, 62 and into the magnetising windings 51, 52. Due to the aforesaid connection of the pairs of exciting windings 31, 32 or 33, 34 the pairs of pick-up windings 41 and 42 or 43 and 44 have, in an analogous way, to be connected in opposite directions as well.

The alternating voltage from the two pairs of pick-up windings 41 and 42 or 43 and 44 is rectified by means of rectifiers 77 or 76. For the purpose of shifting the operational point of these rectifiers 77 and 76 to the linear portion of their characteristic, the voltage from the polarization windings 21 to 24 is also supplied to the above mentioned circuit, said voltage being proportional to the voltage in the exciting windings 31 to 34.

In an unloaded state the runner 74 is in its central position, no current flowing through the feedback windings 61 and 62. If the feeler is stressed by a torsional moment T, a voltage is induced in the pick-up windings 41 to 44; consequently, direct current flows through the central branch and therefore also through the feedback windings 61 and 62, the size and direction of the direct current depending on the size and direction of the torsional moment T.

By the action of direct current in the magnetising coils 51 and 52 a unidirectional cylindrical magnetic field of the same size or of the same intensity is generated in all tubes 155. All exciting windings 31 to 34 exhibit therefore the same inductive reactance. If direct current flows now through the two feedback windings 61 and 62 connected in an opposite direction with respect to each other, said current produces an increase of the uni-directional magnetic flow in one pair of torsional bodies 15, whereas in the other pair of torsional bodies 15 the same current produces a reduction of the magnetic flow. The inductive reactance of one pair of exciting windings (such as 31, 32) is reduced, whereas in the other pair of exciting windings (such as 33 and 34) the inductive reactance is increased.

The equilibrium in the exciting circuit is thus disturbed and, as a consequence, a current flows through the central branch, i.e. through the control winding 71. The motor 70 is set in operation, displacing the runner 74 until equilibrium in both circuits, i.e. in the exciting and pick-up circuits, is re-established. It is important to note that the unbalance of the pick-up circuit is still further increased in consequence of the unequal inductive reactances of the windings 31 to 34 causing unequal voltages to be induced also in the polarization windings 21 to 24. A certain kind of feedback is obtained in this way, which substantially amplifies the influence of the current from the pick-up windings 41 to 44 and thus also the output obtained in the exciting circuit.

In summary, when the center-tapped winding of the transformer 80 is energized, the exciting windings 31 through 34 are energized and the flux therefrom induces voltages in the polarization windings 21 through 24 to bias the diodes 76 and 77 to linear portions of their characteristic curves. Energization of the exciting windings 31 through 34 does not induce voltages in the pick-up windings 41 through 44 because the windings 31, 32, 33 and 34 are orthogonally related with respect to the windings 41, 42, 43 and 44, respectively. Also, energization of the exciting windings does not induce a net voltage in the auxiliary or magnetizing windings 51 and 52, and does not induce a net voltage in the control or feedback windings 61 and 62, due to the fact that the exciting winding 31 is wound in opposition to the exciting winding 32 and the exciting winding 33 is wound in opposition to the exciting winding 34.

A torsional deformation of a feeler apparatus illustratively embodying the principles of the present invention causes voltages to be induced in the pick-up windings 41, 42, 43 and 44, thereby, due to the rectifying action of the diodes 76 and 77, causing a direct current to flow in the diagonal path of the second bridge circuit through the control or feedback windings 61 and 62. Such current flow causes the steady-state flux created by the auxiliary or magnetizing winding 51 to be opposed (or aided, depending respectively on the direction of the torsional deformation) and the steady-state flux created by the auxiliary or magnetizing winding 52 to be aided (or opposed). The value of this current flow through the windings 61 and 62 is directly proportional to the amount of the deformation. The effect on the flux patterns of the windings 51 and 52 is to increase (or decrease) the inductive reactances of the exciting windings 31 and 32 and to decrease (or increase) the inductive reactances of the exciting windings 33 and 34. This causes the first bridge circuit to be unbalanced and an unbalance current to flow through the motor winding 70 to cause the motor 70 to displace the arm 74 until the second bridge circuit is balanced, i.e., until current ceases to flow through the windings 61 and 62. The position of the displaceable arm 74 is, accordingly, a measure of the torsional deformation experienced by the magnetostriction feeler.

In the modified embodiment according to FIG. 2 the wiring of the apparatus is changed only insofar as the pick-up windings 43 and 44 is connected into the pick-up circuit in a direction opposite to that shown in FIG. 13.

The feeler of the feedback type according to the invention is in its essence a magnetic amplifier, mechanically controlled by a torque, a winding with a variable inductance being simultaneously used for exciting the feeler.

The connection of the individual windings may, within the scope of the present invention be carried out also in a way differing from that which is above described, such as used in connection with magnetic amplifiers. All exciting windings 31 to 34 may, for example, be arranged in four branches of a bridge supplied with alternating current, the motor being placed in its central branch, or similar arrangements may be made.

The feeler of the feedback type according to the invention is highly suitable for use in the measuring art, as well as for automation and regulation, its basic advantage being that it yields a signal output which may be directly used without any further amplification for feeding a high-performance regulation member, such as a small size servomotor.

We claim:

1. In combination in a torsional magnetostriction feeler, an assembly including at least one pair of rigidly interconnected torsional bodies, each of said bodies having wound thereon exciting, polarization and pick-up windings, each pair of said bodies having wound thereon feedback windings, a first bridge circuit comprising branch paths in which said pick-up and polarization windings are connected and displaceable diagonal path means in which said feedback windings are connected, motor means including a motor winding, said motor means being adapted to displace said diagonal path means, a second bridge circuit comprising branch paths in which said exciting windings are connected and a diagonal path in which said motor winding is connected, whereby the application of a torsional force to said feeler causes a voltage to be induced in said pick-up windings, thereby causing a current flow through said feeback windings, thereby causing an unbalance of said second bridge circuit and a resultant current flow through said motor winding, thereby causing displacement of said first circuit diagonal path means to a point where the current flow through said feedback windings is reduced to zero.

2. A combination as in claim 1 further including direct current voltage source means and wherein each pair of said bodies further includes thereon auxiliary windings, said auxiliary windings being connected in series and to said source means.

3. A combination as in claim 1 further including means for anchoring an end one of said rigidly interconnected bodies, and means for applying a torsional force to the other end one of said bodies.

4. A combination as in claim 1 further including means for anchoring the end ones of said rigidly interconnected bodies, and means for applying a torsional force to the midpoint of said assembly.

No references cited.